(12) United States Patent
Tran et al.

(10) Patent No.: US 8,571,213 B2
(45) Date of Patent: Oct. 29, 2013

(54) SECURITY METHOD FOR PREVENTING THE UNAUTHORIZED USE OF MULTIMEDIA CONTENTS

(75) Inventors: Minh Son Tran, Bourg la Reine (FR); Pierre-Sernin Dominique Sarda, Montrouge (FR); Geoffroy Virgile Baudin, Oissel (FR)

(73) Assignee: Nagra France SAS (FR)

( * ) Notice: Subject to any disclaimer, the term of this patent is extended or adjusted under 35 U.S.C. 154(b) by 197 days.

(21) Appl. No.: 13/111,202

(22) Filed: May 19, 2011

(65) Prior Publication Data

US 2011/0293092 A1 Dec. 1, 2011

(30) Foreign Application Priority Data

May 26, 2010 (EP) ..................................... 10163979

(51) Int. Cl.
*H04N 7/167* (2011.01)
(52) U.S. Cl.
USPC ........... 380/205; 380/206; 380/210; 380/252; 380/253; 380/254; 705/57; 705/58
(58) Field of Classification Search
USPC ............ 380/205, 206, 210, 252–254; 705/57, 705/58
See application file for complete search history.

(56) References Cited

U.S. PATENT DOCUMENTS

| | | | |
|---|---|---|---|
| 2003/0212893 A1* | 11/2003 | Hind et al. | 713/177 |
| 2006/0153377 A1 | 7/2006 | Ardotto Modiano | |
| 2007/0189525 A1* | 8/2007 | Wajs | 380/42 |
| 2009/0323949 A1 | 12/2009 | Chieze et al. | |
| 2012/0023338 A1* | 1/2012 | Sugahara et al. | 713/193 |

FOREIGN PATENT DOCUMENTS

| | | |
|---|---|---|
| WO | 03/063445 A1 | 7/2003 |
| WO | 2007/116390 A2 | 10/2007 |
| WO | 2008/023023 A1 | 2/2008 |

OTHER PUBLICATIONS

Lishoy Francis et al., "Coutermeasures for Attacks on Satellite TV Cards using Open Receivers," Third Australasian Information Security Workshop: Digital Rights Management, Nov. 6, 2004, pp. 1-6.
Michael Tunstall et al., "Inhibiting Card Sharing Attacks," Advances in Information and Computer Security Lecture Notes in Computer Science, Jan. 1, 2006, pp. 239-251.

\* cited by examiner

*Primary Examiner* — Christopher Brown
*Assistant Examiner* — Roderick Tolentino
(74) *Attorney, Agent, or Firm* — DLA Piper LLP (US)

(57) ABSTRACT

A method embeds tracing secret data into multimedia contents delivered to particular users. The method descrambles a first scrambled video stream having alternate values to obtain a personalized video stream corresponding to an original video stream by a decoder comprising at least a security unit and a descrambling unit, the personalized video stream being obtained by restoring the alternate values by personalized values taking into account an internal parameter on the security unit and received control data containing the original values and their location in the modified stream.

17 Claims, 3 Drawing Sheets

SECURITY METHOD FOR PREVENTING THE UNAUTHORIZED USE OF MULTIMEDIA CONTENTS

RELATED APPLICATIONS

This application claims priority of European Patent Application No. 10163979.7, filed May 26, 2010, herein incorporated by reference.

TECHNICAL FIELD

This disclosure generally relates to conditional access of multimedia contents. In particular, the disclosure relates to a method for embedding the tracing secret data into multimedia contents delivered to particular users.

BACKGROUND

Digital content providers seek to restrict usage by implementing conditional access. One such scenario is the security aspects of digital video broadcasting via satellite (DVB-S). There has been a history of attacks on this technology to circumvent any security measures and some techniques have been countered by the deployment of customized/provider specific receivers. However, this leads to a definitely fixed choice of provider. Hence, a plurality of equipments are necessary at the customer level for multi access of providers. Open satellite receivers have been introduced to allow a single user to access several different services/content providers from a single piece of receiver equipment. These boxes provide a highly configurable environment with software emulations of conditional access systems that is unfortunately open to abuse. The key factor of the security gap is that when an open receiver (even the proprietary one) comes into the possession of the user, it cannot be considered trusted. The user domain is an untrusted one and could be subject to standalone or colluded user attacks. The introduction of smart cards with a built-in processor into such receiver aims to provide a trust in an unsecured environment. It is believed that the answer lies in the smart card: this is the only trusted entity at the client end.

It is worth noting that the introduction of the smart card does not resolve automatically/absolutely all threats to security. Thanks to the flexibility, well modularized structure of the open receivers, fraudulent user can still compromise the system with the "unbreakable" security unit as in the follow. Fraudulent users with the legitimately subscribed card runs a Card Server on their reconfigured/hacked open receiver and listens for (illegal) client communication on a given port. In the Card Server, the conditional access is performed as usual for an authorized client thanks to the legitimate card. That is the Entitlement Management Messages (EMMs) and Entitlement Control Messages (ECMs) are processed by the famous "unbreakable" security unit (still left intact) that in turn decrypts and returns the control words to the descrambler to decrypt the content. By spying the communication between the descrambler and the security unit, the server can further carries out a mass distribution of the control word to its own clients, allowing clients (without subscription to the real content provider) to access encoded DVB programs. It is believed that this attack, namely "Sharing Card Attack," or "Control Word Sharing," will become central to the use of the open receivers in the present as well as in the future. It will affect the industry in the long run by siphoning at a steady rate the industry revenue and potential customers.

Admitting that conditional access never provides absolute security, digital content providers try to deploy the fingerprinting technique to insert automatically unique identification of the demanding user into the final content whenever it is consumed. With the assumption that the fingerprinting process was performed successfully, the tractability feature of the technique could discourage the illegal distribution of the content when the conditional access is defeated. The open receiver can again challenge the implementation of the technique. The inserting process can be circumvented such that the distributed content does not contain any identification at all. It is interesting to note that the fingerprinting technique may mislead the tracing process if it is not designed carefully. For instance, the user with the smart card that drives the Card Server—the primary fraud, i.e., the initial leaking source—may leave no trace on the broadcasted control work. On contrary, the clients who take advantage of the illegal transmission—they are actually the secondary (naive) frauds, i.e., the victims—can incidentally let the fingerprinting process insert their identification into the final consumable content. The primary fraud is never detected in such scenario.

SUMMARY

We provide a method for descrambling a first scrambled video stream to obtain a reconstructed video stream corresponding to an original video stream by a decoder including at least a security unit and a descrambling unit, including the steps of receiving by the decoder the first scrambled video stream in which a plurality of original values of the original video stream at a plurality of locations have been modified by alternate values, receiving by the security unit a control object including a set of control data, each set of control data including data resulting in determination of at least the original, the alternate value as well as a location where an alternate value has been introduced into the first scrambled stream, calculating for each set of control data a key parameter associated with a mathematical operation, wherein the operation and an associated key parameter are selected from among a plurality of different mathematical operations, the mathematical operations resulting in a reconstructed value from the alternate value by way of the key parameter, varying the selection of the mathematical operation based on a first internal parameter of the security unit for each set of control data, transmitting to the descrambler unit a set of correction data corresponding to a designation of the mathematical operation, the key parameter and the location of the alternate value, receiving the correction data by the descrambler unit, calculating the reconstructed value corresponding to the correction data and the alternate values retrieved from the first scrambled stream, and replacing the alternate value by the reconstructed value in the first scrambled stream to obtain the reconstructed video stream.

BRIEF DESCRIPTION OF THE DRAWINGS

The above aspects will become more apparent by describing in detail examples thereof with reference to the attached drawing figures.

DETAILED DESCRIPTION

Figure 1:
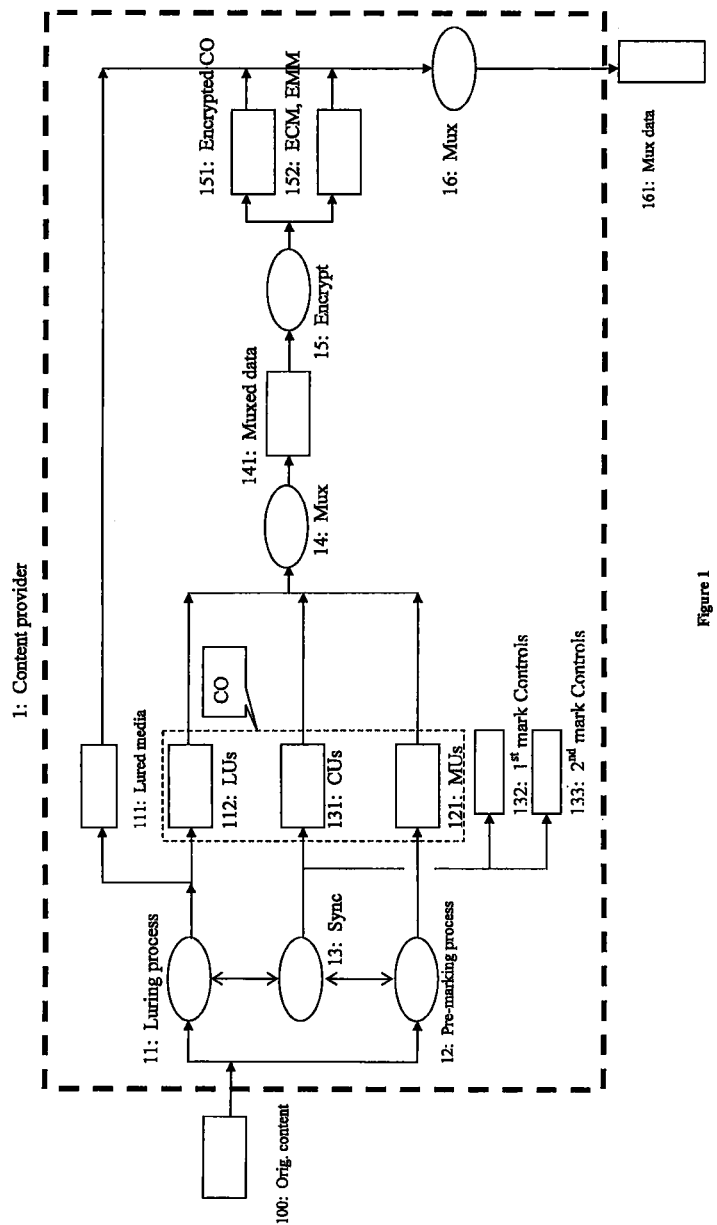
FIG. 1 shows a block diagram of a transmission system (content provider side) to facilitate communication.

On the head and side, the following operations are performed:
1. Parsing the original media file/bitstream.
2. Extracting some relevant binary elements which notably affect the visual and/or audible representation of the given media, those elements are named the original values.

3. Generating dummy data called "lures" or alternate data (AD) and replacing the extracted original values mentioned in step 2 by these alternate data. This process seriously degrades the quality of the original media. The resulting media is referred to as the modified stream. Note that the described process represents an alternative "encrypting" technique in a broad meaning. Therefore the modified stream is also referred to as a scrambled stream.

4. Storing the original value and its location of the elements mentioned in step 2 in the so-called "Control Object" (CO) structure, which will be later re-used in the recovering process of the given media.

Such scrambled media is transmitted to an open receiver without any further protection. On the contrary, the stream of CO must be sent to the security unit of that receiver exclusively through a secured channel. In condition of having all necessary rights, the receiver performs the following operations:

receiving the scrambled stream in which a plurality of original values of the original video stream at a plurality of locations have been modified by alternate values as carrying out at the head end;

receiving by the security unit a control object including a set of control data, each set including data allowing to determine at least the original, the alternate value as well as the location where an alternate value have been introduced into the first scrambled stream;

for each set of control data, calculating a key parameter associated with a mathematical operation, this operation and the associated key parameter being selected among a plurality of different operations, the mathematical operations allowing to obtain a reconstructed value from the alternate value thanks to the key parameter;

varying the selection process of the mathematical operation based on a first internal parameter of the security unit for each set of control data;

transmitting to the descrambler unit a set of correction data corresponding to the designation of the mathematical operation, the key parameter and the location of the alternate value;

receiving the correction data by the descrambler unit;

calculating the reconstructed value corresponding to the correction data and the alternate values retrieved from the first scramble stream; and replacing the alternate value by the reconstructed value in the first scramble stream to obtain the reconstructed video stream.

The reconstructed video may be identical to the original video. Alternatively, the reconstructed video may be a personalized video, which is slightly different from the original video, but such modification is imperceptible to a human viewer.

It can be seen that the Correction Data (CD) plays the role of the control word—the data circulated between the security and descrambler unit—in the classic conditional access. Thanks to marked CD, the source (primary fraud) of its illegal distribution can now be easily detected.

One key feature is to produce by the security unit a set of CD that is individual to the security unit event though the final result on the video stream—the reconstructed video obtained thanks to these personal correction data—is the same as for other CD originating from other security units.

This is possible by using different equivalent presentations of the correction data. That is each CD comprises at least two components: a mathematical operation and a key parameter. There exists a plurality of different mathematical operations, each operation allowing obtaining the identical (original) value from the alternate value thanks to its own key parameter. For instance, to obtain the identical final result, the key parameter will of course not be the same if the selected operation is an addition or a subtraction. But both addition and subtraction with their own, appropriate key parameters can still produce the same result.

Consequently, a mark can be embedded directly into the equivalent presentations of CD (hereafter the mark inserted in such manner is referred to as "Primary Mark" (PM). A mark is uniquely mapped to a sequence of mathematical operations, which is associated to a set of CD. For each CD, the key parameter is then deduced with a given mathematical operation so that the contained reconstructed value for that CD can be obtained.

The mutual relationship between the mathematical operator and its key parameter improves the security of the PM. The hacker cannot simply attack the mathematical operators, the direct carrier of the PM, because any different (compromised) operators are not at all harmonized with the given key parameter. As a result, the CD cannot create correctly the assigned reconstructed value, which severely affects the video quality. Then the hacker has to change the key parameter correspondently. Note that, up to this phase in the receiver, the reconstructed values are not available. Hence, deriving a proper key parameter for a compromised operator is almost impossible.

Furthermore, we provide a method to detect/correct the integration/validity of the PM inserted in the CD, especially for surviving CD from collusion attack.

Another key feature is to produce by the security unit a set of CD that is individual to the security unit so that the final result on the video—the reconstructed data (hence, the reconstructed video) obtained thanks to these personal CD—is also individual for each security unit from the point of view of computer based detection. From the point of view of human perception, the reconstructed video can be considered identical, i.e., its impact on quality is imperceptible distortion for all security units. Hereafter, the mark embedded in the reconstructed data is referred to as "Secondary Mark" (SM).

A mark is now not (only) inserted in the equivalent presentation of the CD, but in the derived reconstructed values, which persist in the reconstructed video. Therefore, usage infringement of the video itself can be also identified. Such marks (SMs) are useful to identify the secondary frauds.

The SM may be based on client-oriented structure. At the head end, the alternate values are generated at as many positions as possible. The reconstructed values for these locations will be actually calculated in the security unit on the function of the SM. The process in the security unit comprises:

extracting the original value from the control object;

calculating the personalized value based on the original value and the SM; and using the personalized value instead of the original value to calculate the operator and key parameter of the CD.

The SM insertion may be based on the distributed structure, including pre-marking and post-marking processes. The pre-marking process selects the positions in the media, as well as preparing all the possible values—referred to as dedicated values—at each position. The post-process eventually occurs in the security unit comprising:

extracting the original value and the set of dedicated values from the control object;

selecting as personalized value among the original value and the set of the dedicated values based on a SM assigned to the decoder; and using the personalized value instead of the original value to calculate the operator and key parameter of the CD.

SM is inserted into the reconstructed value, which is a deduced result from the operator and key parameter of the associated CD. Such implicit presence of SM in the stream increases the security of the mark. Provided that the meaning of the operator is kept in secret (or it is updated periodically), the hacker hardly controls the impact of the modification applied to either operator or key parameter to compromise the mark. It is always possible that the video quality is already degraded, but the presence of the mark is still detectable. Yet the hacker can simply skip that CD (hence, the resulting reconstructed value). In such case, the alternate value occurring at the location in question ensures to introduce enough distortion effect, making the content unusable.

Similar to the PM, the SM can be treated by an anti-collusion pre-processing before being inserted to increase its resistance to attacks.

The method for inserting the PM and SM can be used independently. The nature/hidden information of the two marks can be also unrelated.

Reference will now be made in detail to the preferred aspects, examples of which are illustrated in the accompanying drawings. While our methods will described in conjunction with the preferred examples, it will be understood that they are not intended to limit the disclosure. On the contrary, our methods are intended to cover alternatives, modifications and equivalents, which may be included within the spirit and scope of the disclosure as defined in appended claims. Furthermore, in the following detailed description, numerous specific details are set forth to provide a thorough understanding. However, it will be obvious to one of ordinary skill in the art that our methods may be practiced without these specific details. In other instances, well known methods, procedures, components, and circuits have not been described in detail as not to unnecessarily obscure aspects of our methods.

Figure 2:
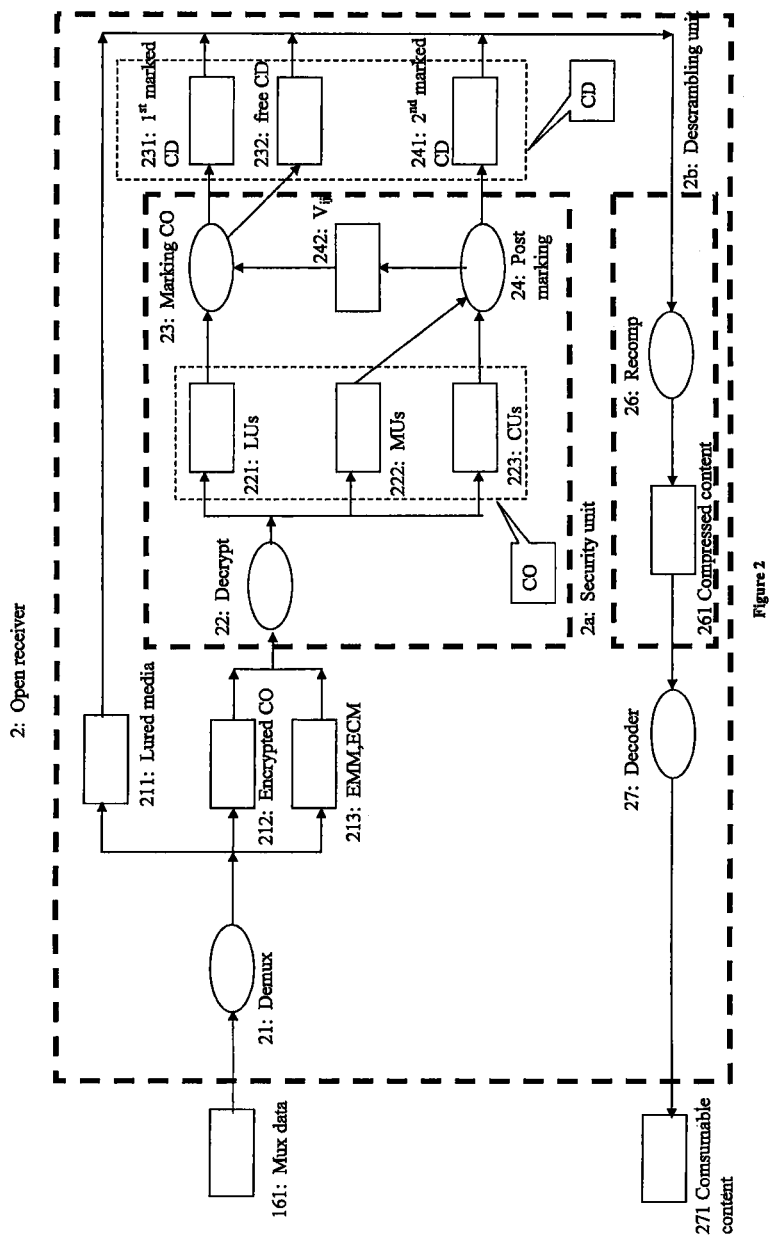
FIG. 2 shows a block diagram of a receiver system to tune in communications.

The target is any decoder (alternatively receiver) having a so-called "opened structure." Such decoder consists of at least a security module 2a and a descrambling module 2b (FIG. 2). In the scenario of a conventional DRM, the former is responsible to the rights management as well as the extraction of the decrypting keys, while the latter performs the decryption with the key (Control word) supplied from the former.

Security units, as mentioned above, can be implemented in a variety of manners such as on a microprocessor card, on a smartcard or any electronic unit in the form of a badge or key. These units are generally portable and detachable from the receiver/decoder and are designed to be tamper-proof. The most commonly used form has electrical contacts but contactless versions of type ISO 14443 also exist. Another implementation of the security unit exists where it is directly soldered inside the receiver/decoder, a variation of this being a circuit on a socket or connector such as a SIM module. Yet another implementation is to have the security unit integrated on a chip which has another function, e.g., on the de-scrambling module or on the microprocessor module of the receiver/decoder. The security unit can also be implemented in pure software without any dedicated hardware. Such software based implementation of the security unit evidently exposes a severe security gap.

FIG. 1 outlines the block functionalities and their associated data at the transmission side according to one example. The original multimedia content 100 is fed to the process 11, which claims to guarantee that the quality of the modified content 111 is significant low—in effect, unusable—to any adversary. As another output of the process, the so-called "Control Object" (CO) is generated, which is necessary for the reconstruction of the origin multimedia content 100 later. An implementation of such process 11 is described in WO 03/063445 A1 (Device for secure transmission recording and visualization of audiovisual programs). Indeed, if one considers the technique in WO 03/063445 A1 as a cryptographic operation, then CO can be considered as its private key/control word, which will be used by client descrambler 2b to "decrypt" the lured content 111. The CO corresponds to a set of modified data in 111, comprising the original value, the alternate value and the location where the replacement was made. A mechanism of conditional access must be applied to CO. According to the example in FIG. 1, the DVB-CA is deployed as follows. Muxer 14 packs CO into the muxed data 141 (At present, CO data refer to 112, 121 and 131 altogether. These detailed types of CO will be explained in the later discussion). The muxed data is then encrypted by entity 15, which transforms the data 141 to encrypted CO 151 and the associated ECM, EMM structures 152—a standardized framework of DVB-CA to enable the decryption at the client side. The data 152 can be any other supplementary data necessary to the process at receiver. We will expand the scope of 152 in the below. In an in-band scenario as in FIG. 1, all the data, including the lured content 111, the encrypted CO 151 and the controls 152 will be muxed again with muxer 16. The resulting multiplex stream 161 is suitable to be transmitted to client.

According to another example, only the lured content 111 is transmitted to the receiver via traditional broadcasting channel (satellite-, cable-channel, terrestrial channel, . . . ). The content 111 can be made available for free downloading from Internet, or any peer-to-peer network. A stored version of the content 111 on any kind of digital storage equipments such as USB key, CD, DVD, Blue-Ray disc, . . . can be already ready to be replayed at the client receiver. Distinctly, the encrypted CO 151 and the controls 152 must be sent to client receiver via a dedicated unicasting link via ADSL, 3G, or Internet connection.

Control message 152 can contain the description of the access conditions of the receiver. Once received by the receiver's security unit, the control message is decrypted and the access conditions are compared with the rights contained in the security unit. If the access conditions match with the rights, the CO can then be processed.

To reduce the quality of a media content, the technique in WO 03/063445 A1, according to one example, analyzes the content of the given media. Several crucial syntax elements will be then extracted: their origin values are saved into CO; alternate data (AD) are generated into their location. The introduction of the AD generates the lured stream 111, which has the same syntax as the original stream 100. However, the content of the stream 111 is completely different/degraded in comparison with the content 100 from the view point of human perception. The 3-tuple structures—including locations, the sizes and the origin values of the extracted syntax elements—are registered in CO so that later on, with a simple replacing operator, the original values of the associated syntax elements, and therefore the quality of the content can be recovered correctly.

According to another example, the AD are also registered in CO to be able to produce the PM. Each extracted syntax element is now saved as a 4-tuple structure (Origin value, AD, location and size) in CO.

Either 3- or 4-tuple structure is referred to as a "Luring Unit" (LU) 112 hereafter.

FIG. 2 outlines the block functionalities and their associated data at the reception side according to one example. The multiplexed stream 161 constructed as in FIG. 1 is now handled in a model of open receiver. The demuxer 21 separates the data 161 into modified media 211, encrypted CO 212 and if applicable EMM, ECM data 213.

According to another example, the encrypted CO 212 and the controls data 213 are received directly from a dedicated unicasting link.

In the security unit, COs are decrypted with keys pertaining to the conditional access system and in case that access conditions are included in 213, the access conditions are checked against the right stored in the security unit to authorize the further treatment of the COs.

In case that the access conditions are met, the CO is then processed in view of furnishing to the descrambler of the receiver the Primary Marked Correction Data PMCD 231 to descramble the modified stream.

Embedding the Primary Mark

According to a first aspect, the CO contain a set of modified data, each modified data comprising at least the original value, the alternate value and the location where the modification was made in the original stream.

Also according to the first aspect, from the CO, one can derive only the LUs (112, 221) to calculate the Correction Data CD, which in turn consists of data of type PMCDs 231 only. We will detail other type of CD later on.

According to one example, the treatment of the data 212 and 213 occurs completely inside the security unit, which can be considered as the unique trusted entity at the client side. The process 22 decrypts LUs 221, then pass them through the entity 23 before delivering to the descrambling unit 2b a new form of data: Primary Marked Correction Data PMCDs 231. The role of PMCD is to be combined with the lured media 211 within the Re-compositor 26 to produce the reconstructed data, which are actually the original data for each of the extracted syntax elements. Such reconstructed compressed content 261 (identical to the compress original content 100) is then decoded by the entity 27 to become a meaningful content 271, which is useable to clients.

According to one example, the main functionality of the process 23 is to convert CO to CD. In the scope of the first aspect, the process 23 transforms a LU 221 to a MPCD 231, including the following steps:
  Copy the Offset and Size from LU to PMCD
  Select arbitrarily a value for Mathematical Operator
  Basing on the chosen Operator, the alternate values (if exist) and the original value stored in LU, the Key parameter can be derived.

According to one example, the process 26 is performed in the Descrambling unit of the open structured receiver. The traffic of PMCD between the security unit and descrambling unit is the target of the control word attack.

According to one example, the first two fields of PMCD identify the starting position as well as the length of the correction that must be performed in the re-compositor 26. The last two fields specify how, i.e., which kind of Mathematical Operator, the process 26 must apply the Key parameter to the lured media to reproduce the origin value at the given position.

According to one example, whenever the re-compositor 26 receives a PMCD having Offset X, Size 1, Mathematical Operator L and Key parameter of value $A-B \ll 1$, the following operations must be carried out:
  Go to the position X in the current access unit of the lure media 211.
  Extract from that position 1 bits. Call the extracted quantity B.
  Perform binary shift 1 bit to the left on B, add the result to $A-B \ll 1$. This is the designated mathematical operation for the operator L (see Table 1).
  The resulting quantity (reconstructed value) is set back to the 1 bits starting from the position X.

Supposing that the original data in the original stream is denoted A, the dummy data (alternate value) in the modified stream is denoted B. Table 1 shows various mathematical operations and the associated key parameter. We can imagine a lot of these operations/concatenated operations with all type of data manipulation. Note that the way the security unit calculates the key parameter is different from the operation executed in the descrambler 26. For example, the security unit, while selecting the addition D should in fact calculate a subtraction since the key parameter will be $k=A-B$. As a consequence, the descrambler can execute an addition with the key parameter and retrieve the value A.

The PMCD therefore comprises the designation of the mathematical operation (see designation in Table 1) and the key parameter as well as the location of the dummy data. Once the descrambler receives the PMCD, it extracts the dummy data B from the modified stream and selects the correct mathematical operation (from a library of all mathematical operations) thanks to the designation of the mathematical operation. The dummy data B and the key parameter k are used by the selected mathematical operation to calculate the original data A.

The descrambler then replaces the dummy data B by the newly calculated original value A. For each correction data, the same procedure is executed to obtain the original data.

Now back to the behavior of the security unit. As we have seen before, all mathematical operations allow retrieving the original data A. One important aspect is the fact that the security unit can freely select the operation itself. Exploiting this virtue, the selection is not at all random but is dictated by at least one internal parameter of the security unit, i.e., the Primary Mark PM.

A simple example of such internal parameter is the unique address of the security unit. Let's imagine that we have a selection of 16 mathematical operations and the unique address UA contains 32 bits. We can then split the UA into 8 blocs of 4 bits, each block of data serving to point to the selected mathematical operation. Each time a correction data

TABLE 1

The role of the mathematical operators

| Operator | Designation | Original | Alternate | Execution descrambler 26 | Key par. |
|---|---|---|---|---|---|
| Overwrite (O) | 0 | A | B | $A \to B$ | A |
| Add (D) | 1 | | | $B + (A - B) \to B$ | $A - B$ |
| Sub (S) | 2 | | | $B - (B + A) \to B$ | $B + A$ |
| XOR (X) | 3 | | | $B \text{ xor } (A \text{ xor } B) \to B$ | $(A \text{ xor } B)$ |
| 1 bit shift to left and Delta (L) | 4 | | | $B \ll 1 + (A - B \ll 1) \to B$ | $A - B \ll 1$ |
| 1 bit shift right and Delta (R) | 5 | | | $B \gg 1 + (A - B \gg 1) \to B$ | $A - B \gg 1$ | is produced by the security unit, another data block of the UA is used to select the operation. Whenever 8 correction data have been generated by the security unit, the complete UA can be known by reading the designation of the mathematical operation contained in the successive correction data sent to the descrambler. A sweep counter is used to sweep the 8 blocks and incremented at each production of the correction data. This sweep counter will rotate from 1 to 8.

According to one example, the combination of the Operator values in a predefined number of PMCDs can be exploited to encode/embed the ID of the smart card as the internal parameter of the receiver. Constrained by the ID, the Operator value of PMCD is no longer a free factor. Yet, the re-composition of the compressed content 261 is still possible thanks to the proper tuning of the related Key parameter. Table 2 illustrates the encoding of the IDs via the Operator values of 5 PMCDs. The possible values of a PMCD are taken from Table 1.

According to one example, the control data 152 can further contain some synchronization information allowing defining which block should be used. The simplest way is to add a single bit in the PMCD to resynchronize the sweep counter. Other resynchronization can be decided on the transmission side, e.g., for each group of pictures GOP.

Another way to select the block of the internal parameter that will influence the selection of the mathematical operation is based on the use of the location information. As previously explained, the location is part of the control object. It is then possible to use the last 5 bits of the location to address the bit (or bits) of the internal parameter that decide the selection. Alternatively, a hash function of the location can be used to create a better entropy. The hash value will then select the first bit participating to the selection of the mathematical operation.

The example above of the internal parameter is given for the unique address of the security unit. It is to be noted that according to another example, the function of the UA can be used rather than the UA itself. This function can be a cryptographic function with a key known by the security unit and the management center. This key is common to all security units.

The internal parameter used for the selection step can be a group address, i.e., common to a group of security units.

A command can be added into the control object CO to activate or deactivate this function. In case of deactivation, the same mathematical operation will be used for all CD.

TABLE 2

Inserting ID implies the combination of Operator of CDs

| | PMCD 1 | PMCD 2 | PMCD 3 | PMCD 4 | PMCD 5 | ID |
|---|---|---|---|---|---|---|
| Combination 0 | O | O | O | O | O | 0 |
| Combination 1 | O | O | O | O | D | 1 |
| ... | | | | | | |
| Combination $4^5$-1 | R | R | R | R | R | $4^5$-1 |

According to another example, CDs affected by the deactivation of the UA function are considered as a free CD 232, i.e., its Mathematical Operator can be selected arbitrarily without any constraint. Their role is uniquely for the reconstruction of the original values In addition to carrying an ID, some PMCDs can be also exploited to encode some checking/correcting algorithms like Reed-Salomon coding, Hamming coding and the like, which are calculated over the ID itself. Thanks to these algorithms, the ID detection process later on can even recover the right value of the internal parameter in the occurrence of several damaged PMCDs, which is useful in the case of collusion attack.

Embedding the Secondary Mark

According to a second aspect, the COs can further contain MUs 121, 222. In the Correction Data CD, the Second Mark Correction Data SMCD 241 can be also found.

According to one example, a so-called "Pre-marking process" 12 is added as shown in FIG. 1. It is used to embed the so-called Second Mark (SM). Actually, it can be a conventional watermarking/fingerprinting process, which analyses the input content 100 to embed a certain number of identifications ID in an imperceptive manner. The identification of the security unit is an instance of the internal parameter, as discussed in detail in the embedding process of the PM.

One constraint must be taken into account while executing the fingerprinting process. That is the insertion of every ID will modify at most fixed, well localized numbers of syntax elements in the media (hereafter these elements are referred as "Mark Hookers" (MHs)). For instance, in the case of one frame video, the insertion of N number of IDs will modify the values of at most 5 pixels, having the fixed locations $\{(x_1,y_1), (x_2,y_2), \ldots, (x_5,y_5)\}$. According to one example, each of these pixels can take one from 2 dedicated (luminance) values to embed all IDs (it implies $N \leq 2^5 = 31$). In other words, there exists a set of 10 values for these 5 pixels as following:
$\{(V_{11},V_{12}), (V_{21},V_{22}), \ldots, (V_{51},V_{52})\}$, where $V_{ij}$ with $j \in \{1,2\}$ and $i \in \{1, 2, \ldots, 5\}$.

These $V_{ij}$ values are selected so that the embedding of an ID can be uniquely defined as a combination of the possible values over these 5 pixels. Such mapping is illustrated in Table 3.

TABLE 3

Inserting ID implies the toggling values of each pixel

| | Pixel 1 | Pixel 2 | Pixel 3 | Pixel 4 | Pixel 5 | Derived ID |
|---|---|---|---|---|---|---|
| Combination 0 | $V_{11}$ | $V_{21}$ | $V_{31}$ | $V_{41}$ | $V_{51}$ | 0 |
| Combination 1 | $V_{11}$ | $V_{21}$ | $V_{31}$ | $V_{41}$ | $V_{52}$ | 1 |
| ... | | | | | | |
| Combination 31 | $V_{12}$ | $V_{22}$ | $V_{32}$ | $V_{42}$ | $V_{52}$ | 31 |

Correspondently, new component of CO, namely Marking Unit (MU) 121 is created, which contains the position, the size and the two values $V_{ij}$ of each MH. That is each MH is registered as a 4-tuple structure (Dedicated value 1, Dedicated value 2, location and size) in MU. In the case of non-binary MU, the structure of MU will be extended with as many values as the possible values at each pixel location.

According to one example, the mapping in Table 3 is incorporated with some checking/correcting algorithms like Reed-Salomon coding, Hamming coding and the like, which are calculated over the ID itself. Thanks to these algorithms, the ID detection process later on can even recover the correct value even with the occurrence of several damaged SMCDs, which is useful in the case of collusion attack.

The process 24 takes the responsibility to convert any MUs to SMCDs as following:

Copy the Offset and Size from MU to SMCD,

Determine the appropriate value $V_{ij}$ as in Table 3 according to SM,

Select arbitrarily a value for Operator (therefore it is not a PMCO),

Basing on the selected Operator and the $V_{ij}$, the Key parameter can be derived.

According to another example, the post marking 24 can actively generate the $V_{ij}$ by itself. In this case, the structure of MU does not necessarily contain the dedicated values $V_{ij}$, which can drastically save the bandwidth of the dedicated channel deployed for transmitting the CO 151 and control data 152. Thanks to the information 152, the process 24 can perform the identical watermarking/fingerprinting as in 12. Therefore the $V_{ij}$ can be derived directly on the security unit in the receiver.

According to one example, any SMCD can be considered as a free CD 232, i.e., its Mathematical Operator can be selected freely without any constraint.

Note that the syntax of LUs (112, 221) and MUs (121, 222) are different, but those of PMCD (231), SMCD (241) and Free CD (232) are identical, which improves the security of the marks. These three types of CD: PMCD, SMCD and Free CD are responsible to derive the reconstructed data to correctly recompose the content. In addition, the PMCD and SMCD carry the Primary mark embedded in the operator and the Second mark hidden in the reconstructed data respectively. The free CDs are relatively less important from the viewpoint of tracing the non authorized usage. Intuitively, hackers should try to drop out all the PMCD and SMCD—they may have less impact on the reconstruction of the video—while leave in tact all the free CDs to reconstruct as many as possible the extracted/modified syntax elements. Such manipulation excludes any proof for tracing implied in PM and SM. Inspecting the traffic of CDs, hackers hardly distinguish one type from others thanks to the similar data structure of the CDs. Therefore, eliminating all PMCD and SMCD and keeping only free CD in the descrambling unit 2b are not trivial at all.

Combined Scenario of the PM and SM

According to one example, a CO (CD) can play a double role: it can be LU and MU (PMCD and SMCD) at the same time. Two independent processes 11 and 12 can produce an extracted syntax element and a MH at the same location.

If the synchronization unit 13 detects a coincidence in extracted MHs and syntax elements, the correspondent LU and the MU will be replaced with a new component of CO, namely Combined Unit (CU) 131.

According to one example, CU is a 5-tuple data, including the position and the size of extracted syntax element/MH, 2 values $V_{ij}$ and ADs.

According to one example, CU has the same structure as LU. In this case, the process 24 itself will generate the dedicated values $V_{ij}$ inside the security unit.

To create the CD from this type of CO, the CUs are first treated as MUs. That is they will be firstly fed to the process 24 to embed to secondary mark, i.e., determining the $V_{ij}$ 242. Next, the resulting SMCD will be routed back to the process 23 to add the primary mark, i.e., determining the Operator (and the associated Key parameter).

Figure 3:
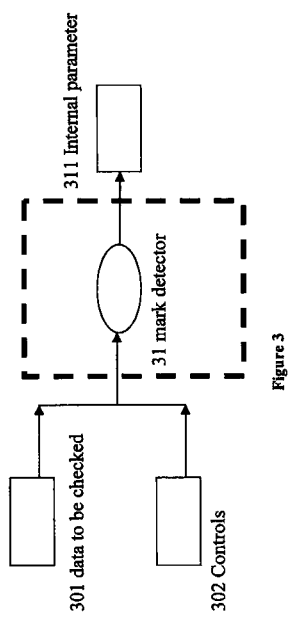
FIG. 3 illustrates necessary input data to detect the mark.

FIG. 3 outlines the necessary input data to detect the mark according to one example. The principles to detect the primary or secondary marks are similar. For the former, the data 301 are the CDs. To locate the PMCDs from the possible free CDs, the process 31 requires the PMC 132 as the additional control data 302. For the case of secondary marks, the consumable data 271 become the data 301, while the control data 302 correspond to the SMC 133.

What is claimed is:

1. A method for descrambling a first scrambled video stream to obtain a reconstructed video stream corresponding to an original video stream by a decoder comprising at least a security unit and a descrambling unit, comprising the steps of:
   receiving by the decoder the first scrambled video stream in which a plurality of original values of the original video stream at a plurality of locations have been extracted from the original stream and modified by alternate values;
   receiving by the security unit a control object comprising a set of control data, each set of control data comprising data resulting in determination of at least the original value extracted from the original stream and, the alternate value as well as a location where an alternate value has been introduced into the first scrambled stream;
   calculating for each set of control data a key parameter associated with a mathematical operation, wherein the operation and an associated key parameter are selected from among a plurality of different mathematical operations, said mathematical operations resulting in a reconstructed value from the alternate value by way of the key parameter;
   varying the selection of the mathematical operation based on a first internal parameter of the security unit for each set of control data;
   transmitting to the descrambler unit a set of correction data corresponding to a designation of the mathematical operation, the key parameter and the location of the alternate value; receiving the correction data by the descrambler unit;
   calculating the reconstructed value corresponding to the correction data and the alternate values retrieved from the first scrambled stream;
   replacing the alternate value by the reconstructed value in the first scrambled stream to obtain the reconstructed video stream;
   and wherein said control object further comprises a set of dedicated values associated with the original value in the modified data, said reconstructed value is a personalized value, said personalized value being determined according the following steps: extracting the original value and a set of dedicated values from the control object; selecting as personalized value among the original value and the set of the dedicated values based on a second internal parameter of the decoder; and applying the personalized value instead of the original value to calculate the key parameter.

2. The method of claim 1, wherein said reconstructed value is equal to the original value to obtain the original video stream.

3. The method of claim 1, wherein the first internal parameter is formed by a plurality of data blocks, the selection process being parameterized by one data block, each data block being sequentially used for the selection process.

4. The method of claim 1, wherein the first internal parameter represents a unique address of the decoder, the first internal parameter is the unique address or is a function of the unique address.

5. The method of claim 1, wherein said reconstructed value is a personalized value determined according to the following steps:
   extracting the original value from the control object;
   calculating the personalized value based on the original value and a second internal parameter of the decoder; and
   applying the personalized value instead of the alternate value to calculate the key parameter.

6. The method of claim 5, wherein the second internal parameter comprises by a plurality of data blocks, the selection process being parameterized by one data block, each data block being sequentially used for the selection process.

7. The method of claim 5, wherein the second internal parameter represents a unique address of the decoder, the second internal parameter equals the unique address or is a function or the unique address.

8. The method of claim 5, wherein the personalized value produces an imperceptible distortion to human perception compared to the original video stream.

9. The method of claim 1, wherein the alternate value introduces a severe distortion in the first scrambled video stream compared to the original video stream.

10. The method of claim 1, Wherein the first scrambled stream has a same format syntax as the original video stream.

11. The method of claim 1, wherein the security unit is a Smartcard module.

12. The method of claim 1, wherein said internal parameter is data resulting from an algorithm performing a logical verification on integration/validity of the internal parameter itself.

13. A method of descrambling a first scrambled video stream to obtain a reconstructed video stream corresponding to an original video stream by a decoder comprising at least a security unit and a descrambling unit, comprising the steps of:
   receiving by the decoder the first scrambled video stream in which a plurality of original values of the original video stream at a plurality of locations have been modified by alternate values;
   receiving by the security unit a control object comprising a set of control data, each set of control data comprising data resulting in determination of at least the original value, the alternate value as well as a location where an alternate value has been introduced into the first scrambled stream;
   calculating for each set of control data a key parameter associated with a mathematical operation, wherein the operation and an associated key parameter are selected from among a plurality of different mathematical operations, said mathematical operations resulting in a reconstructed value from the alternate value by way of the key parameter;
   varying the selection of the mathematical operation based on a first internal parameter of the security unit for each set of control data;
   transmitting to the descrambler unit a set of correction data corresponding to a designation of the mathematical operation, the key parameter and the location of the alternate value;
   receiving the correction data by the descrambler unit;
   calculating the reconstructed value corresponding to the correction data and the alternate values retrieved from the first scrambled stream; and
   replacing the alternate value by the reconstructed value in the first scrambled stream to obtain the reconstructed video stream, wherein said reconstructed value is a personalized value determined according to the following steps:
      extracting the original value from the control object;
      calculating the personalized value based on the original value and a second internal parameter of the decoder; and
      applying the personalized value instead of the alternate value to calculate the key parameter.

14. The method of claim 13, wherein the second internal parameter comprises by a plurality of data blocks, the selection process being parameterized by one data block, each data block being sequentially used for the selection process.

15. The method of claim 13, wherein the second internal parameter represents a unique address of the decoder, the second internal parameter equals the unique address or is a function or the unique address.

16. The method of claim 13, wherein the personalized value produces an imperceptible distortion to human perception compared to the original video stream.

17. A method of descrambling a first scrambled video stream to obtain a reconstructed video stream corresponding to an original video stream by a decoder comprising at least a security unit and a descrambling unit, comprising the steps of:
   receiving by the decoder the first scrambled video stream in which a plurality of original values of the original video stream at a plurality of locations have been modified by alternate values;
   receiving by the security unit a control object comprising a set of control data, each set of control data comprising data resulting in determination of at least the original value, the alternate value as well as a location where an alternate value has been introduced into the first scrambled stream;
   calculating for each set of control data a key parameter associated with a mathematical operation, wherein the operation and an associated key parameter are selected from among a plurality of different mathematical operations, said mathematical operations resulting in a reconstructed value from the alternate value by way of the key parameter;
   varying the selection of the mathematical operation based on a first internal parameter of the security unit for each set of control data;
   transmitting to the descrambler unit a set of correction data corresponding to a designation of the mathematical operation, the key parameter and the location of the alternate value;
   receiving the correction data by the descrambler unit;
   calculating the reconstructed value corresponding to the correction data and the alternate values retrieved from the first scrambled stream; and
   replacing the alternate value by the reconstructed value in the first scrambled stream to obtain the reconstructed video stream, wherein said control object further comprises a set of dedicated values associated with the original value in the modified data, said reconstructed value is a personalized value, said personalized value being determined according the following steps;
      extracting the original value and a set of dedicated values from the control object;
      selecting as personalized value among the original value and the set of the dedicated values based on a second internal parameter of the decoder; and
      applying the personalized value instead of the original value to calculate the key parameter.

* * * * *